Feb. 16, 1943.   F. H. HOY   2,310,957
APPARATUS FOR THE MULTIPLE MOLDING OF HAMS AND THE LIKE
Filed May 3, 1941   2 Sheets-Sheet 2
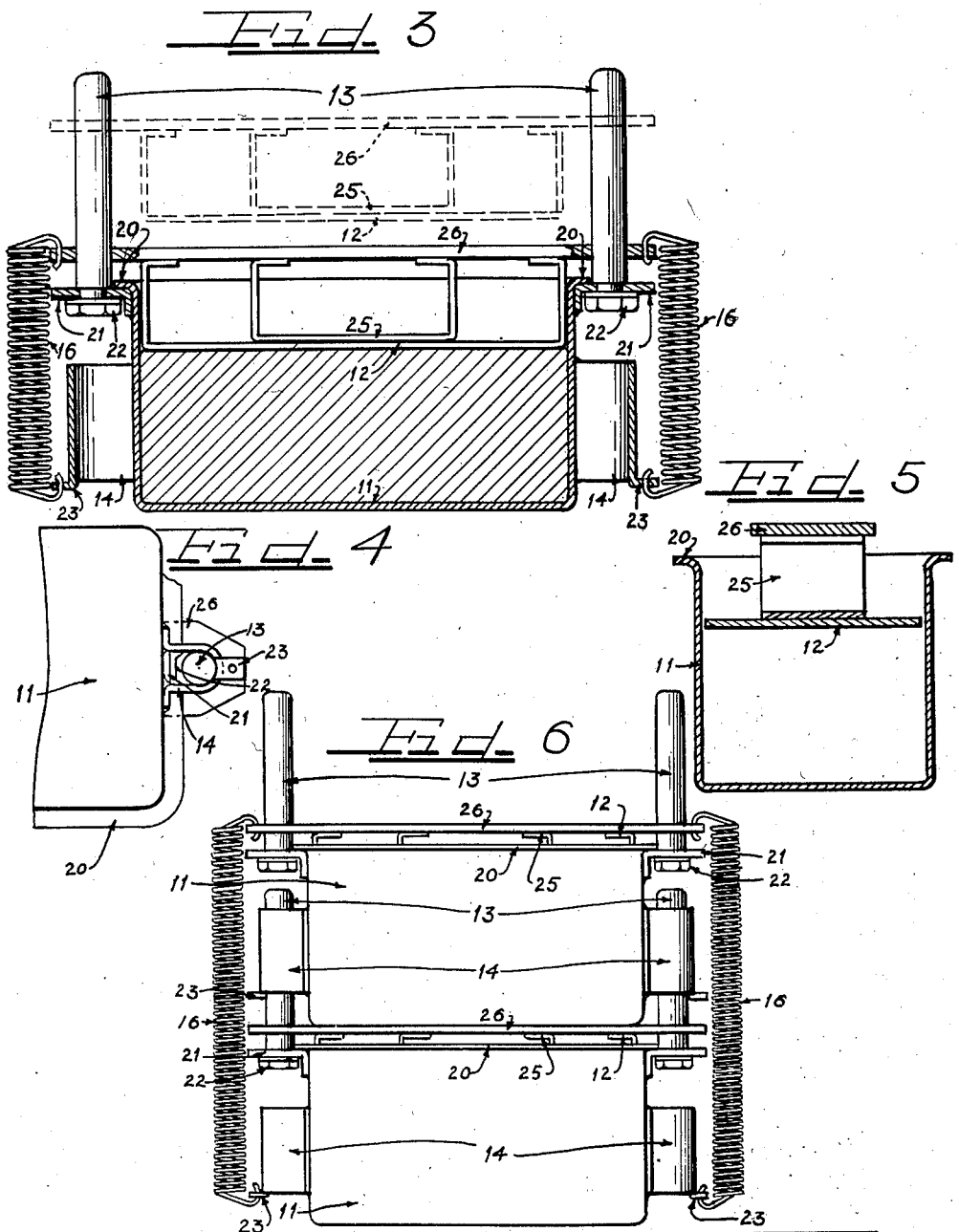
Inventor
Frank H. Hoy.
by
Attys.

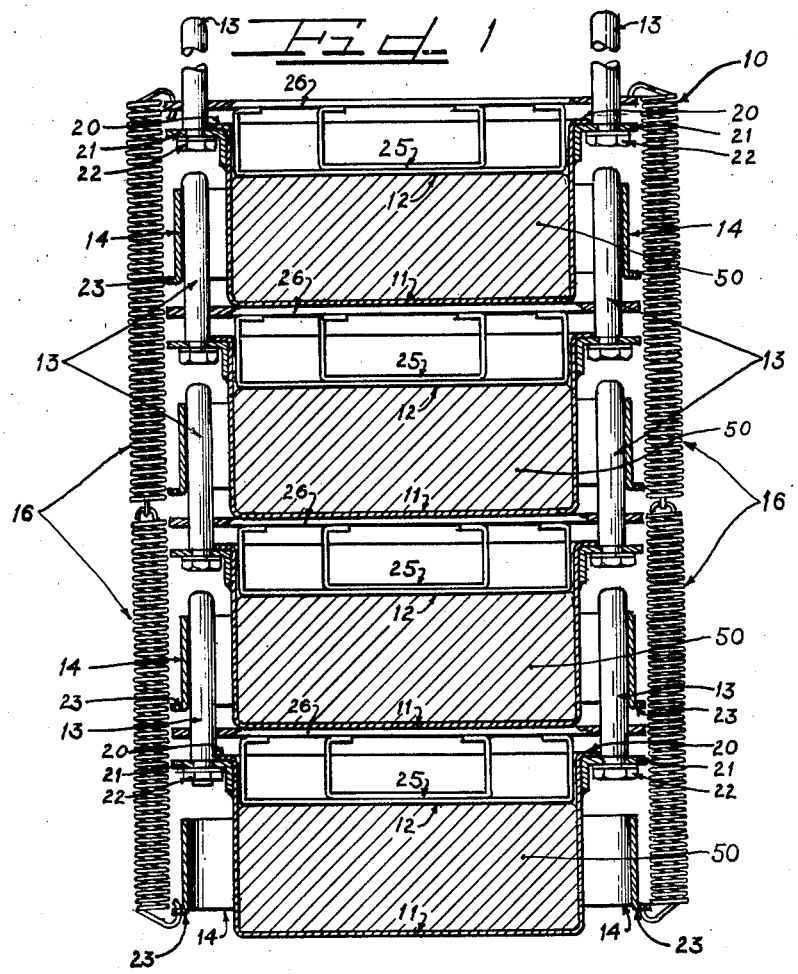
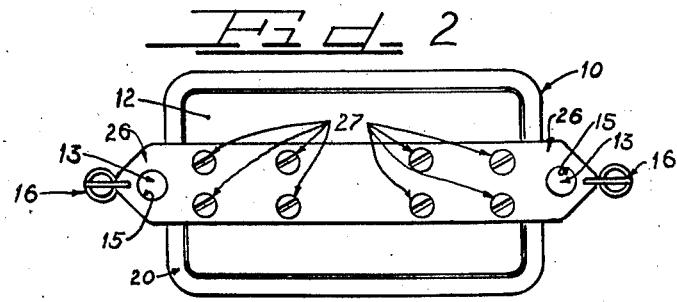

Patented Feb. 16, 1943

2,310,957

UNITED STATES PATENT OFFICE 2,310,957

APPARATUS FOR THE MULTIPLE MOLDING OF HAMS AND THE LIKE

Frank H. Hoy, Milwaukee, Wis., assignor to Hoy Equipment Company, Milwaukee, Wis., a corporation of Wisconsin Application May 3, 1941, Serial No. 391,635

12 Claims. (Cl. 53—22)

This invention relates to an apparatus for cooking and pressing meat products, such as hams and the like, from which the bones have been removed.

The present application is a continuation-in-part of my application Serial No. 348,630, filed July 31, 1940, entitled "Method of and apparatus for the multiple molding of hams and the like."

The apparatus of the present invention is particularly adapted for use in processes for cooking and molding meat products, including the steps of forcibly compressing meat in a plurality of molds and then, while maintaining the meat under less forceful pressure, cooking or otherwise processing the compressed meat which is finally cooled while still in the molds. This whole process is carried out continuously, the molds being combined in unitary groups for compressing and the groups of compressed molds being transported as units into and out of processing tanks and finally subjected to cooling.

It is an object of the present invention to provide a simplified meat pressing and molding apparatus including a predetermined number of stacked self-aligned molds, and which aligned molds are retained against shifting out of stacked relation and alignment whereby they may be handled as a single portable unit during the processing of the meat.

Another object of this invention is to provide an apparatus for multiple pressing and molding of meat including molds having guide means associated therewith for assembling said molds in alignment alternately with follower members.

A further object of this invention is to provide an apparatus for multiple pressing and molding of meat, and which is easily cleaned and kept in a sanitary condition.

The apparatus of the present invention may be generally described as including a plurality of open-topped molds having upstanding guide rods or other guide means associated therewith that are connected to the sides of the molds. The molds are adapted to be stacked in vertical alignment alternately with follower members that are formed to receive slidingly the guide rods. Pressure generating means serve to telescope the follower members and molds. Springs are provided to maintain the telescoped relationship under resilient pressure.

Any desired number of molds and follower members may be assembled as a portable unit. Alignment is maintained from the moment of assemblage, without the need of any frames or separate guiding means.

Other and further objects and features of this invention will become apparent from the following description and appended drawings which disclose preferred embodiments of the invention.

On the drawings:

Figure 1 shows a fragmentary vertical longitudinal cross-sectional view, with parts in elevation, of an apparatus according to this invention including four stacked molds.

Figure 2 shows a top view of the apparatus of Figure 1.

Figure 3 shows a fragmentary vertical longitudinal cross-sectional view, on a larger scale, with parts in elevation, of an apparatus according to this invention including a single mold and a single follower member.

Figure 4 is a fragmentary bottom plan view, on a larger scale, of a mold such as those included in the apparatus of Figures 1, 2, 3, and 6.

Figure 5 is a transverse vertical cross-sectional view of a mold and a follower member such as those included in the apparatus of Figures 1, 2, 3, and 6 as assembled in said apparatus.

Figure 6 is a side elevational view, on a larger scale, of an apparatus according to this invention including two molds.

Like numerals indicate like parts throughout the drawings.

As shown on the drawings:

In Figures 1 and 2, the reference numeral 10 indicates generally an apparatus for processing and molding meat according to this invention. This apparatus includes four molds 11 stacked in alternate alignment with four plates 26, from which four follower members 12 telescoped into the molds are suspended. Guide rods 13 attached to opposed sides of the molds are received in sliding fit by ears 14 on the mold sides in vertical alignment with the rods and in similarly aligned apertures 15 in the plates. Springs 16 urge the follower members into the molds.

As also shown in Figures 4 and 5, the brims of the molds terminate in flanges 20. Angle irons 21 affixed to the under sides of the flanges and to subjacent mold sides on opposed sides of the molds support the guide rods that are attached thereto by nuts 22.

The ears 14 are U-shaped, being attached to the side walls of the molds below the angle irons 21 to receive the guide rods 13 in sliding fit with the bights of the U's. Perforated lugs 23 project outwardly from the lower outer edge of the ears.

The follower members 12 have a U-shaped cross section, the ends of the shanks being deflected inwardly at right angles. The follower members include another relatively narrower U-shaped member 25 attached to the upper side of the first mentioned U-shaped member to reinforce the same. The ends of the shanks of the second member are also deflected inwardly flush with the ends of the first U-shaped member. The plate 26 is attached to the deflected ends of both U-shaped members by screws 27 and has perforated projecting ends aligned vertically with the lugs 23, the perforations in both members also being aligned vertically. The ends of the springs 16 are hooked into these perforations.

Figure 3 shows an apparatus according to this invention including a single mold 11 and a single follower member 12 identical with those shown in Figures 1, 2, 4, and 5. The follower member 12 is shown in full lines as fitted inside the mold; in broken lines, as being assembled therewith. This figure shows clearly how the guide rods maintain vertical alignment from the initial moment of assemblage and how telescoped relationship is maintained by the springs.

Figure 6 shows an apparatus according to this invention including two molds 11 and two follower members 12 identical with those shown in the other figures.

In operating apparatus according to this invention, any desired number of molds, from a single mold up, are filled with meat products, for instance, hams, designated by the reference numeral 50. The molds are stacked alternately with a like number of follower members. Vertical alignment is effected from the initial moment of assemblage and maintained thereafter. The follower members are then telescoped into the molds by pressure generating means such as jacks. Springs are hooked onto the assembled molds and follower members after telescoping has been effected, to maintain the telescoped relationship. The assembled unit, when placed in a processing tank, affords free access for fluid processing media to all sides of the molds.

In a telescoped assembly, a uniform pressure is maintained by the springs, for each mold is independently movable in response to shrinkage of meat therein or in response to increased internal pressure due, for instance, to accumulation of steam.

The number and strength of the springs used can be accommodated to the number of molds stacked as a unit. Figure 1 shows two springs hooked together on each side of an assembly of four molds. Figure 3 shows a single short spring telescoping a single follower member into a single mold. Figure 6 shows a single spring of the same length as those of Figure 1 compressing an assembly of two molds.

The molds and follower members are suitably stamped from stainless steel, to form smooth corrosive-resistant surfaces devoid of crevices and seams. The molds are preferably, but not necessarily, rectangular.

The guide rods 13 are removable, and hence need not be constructed of stainless steel.

It is evident that the provision of guide rods attached to each mold greatly facilitates assemblage and disassemblage of the apparatus by reducing the number of relatively movable parts.

This invention is not confined to the above described preferred forms. Many variations are possible. The positions of the guide rods and the ears on the sides of the molds may be reversed. In place of guide rods and ears, longitudinally slotted tubes encompassing and slidable over T-shaped rails may be provided. The reinforcing members of the follower members need not be U-shaped but may bridge the follower members longitudinally. If desired, the follower members may also have a U-shaped transverse cross section.

The broad scope of the present invention includes apparatus for processing and molding meat comprising any desired number of open-topped molds and follower members telescopable thereinto maintained in alternate alignment by separate guide means associated with each mold. It is therefore not my intention to limit the patent granted on this invention otherwise than necessitated by the scope of the appended claims.

I claim as my invention:

1. In an apparatus for processing and molding meat, a plurality of open-topped molds, a plurality of follower members telescopable into said molds, said molds and follower members alternating with each other in aligned relationship, separate means associated with each mold for maintaining said aligned relationship while said apparatus is assembled, and pressure generating means for telescoping said follower members into said molds.

2. In an apparatus for processing and molding meat, a plurality of open-topped molds, a plurality of follower members telescopable into said molds, said molds and follower members alternating with each other in aligned relationship, pressure generating means for telescoping said follower members into said molds, and guide rods attached to each mold, said follower members being perforated and said molds being provided with ears to receive said rods in sliding fit.

3. In an apparatus for processing and molding meat, a plurality of stacked open-topped molds, said molds being provided with guide rods and ears adapted to receive guide rods of other molds in sliding fit, said apparatus further including follower members fitting said molds slidably and perforated to receive said rods slidably, said follower members alternating with said molds in stacked relationship, and pressure generating means coacting with said molds and follower members.

4. Apparatus for processing and molding meat including a plurality of stacked open-topped molds, said molds having upstanding guide rods attached to opposite sides thereof and having guiding means attached to said opposite sides below said rods in alignment therewith to receive the rods of subjacent molds in sliding fit, said guiding means being provided with outwardly projecting perforated lugs, said apparatus further comprising U-shaped follower members slidably fitting said molds, U-shaped reinforcing members inside said follower members, plates to which said U-shaped follower members and reinforcing members are attached, said plates having terminal perforations aligned vertically with the perforations in said guiding means, and springs hooked into the perforations in said plates and in said guiding means for coating with said molds and follower members.

5. As an article of manufacture, an open-topped mold for meat products adapted to be stacked with other like molds, said mold having upstanding guide rods and guiding means adapted to receive in sliding fit guide rods of subjacent molds when said mold is stacked with other like molds.

6. In an apparatus for processing and molding meats including aligned open-topped molds and follower members slidable therein alternating with said molds in aligned relationship, the improvement comprising molds having rod guiding means and guide rods slidably receivable by said means and by said follower members for maintaining said aligned relationship.

7. In an apparatus for processing and molding meats including aligned open-topped molds, the improvement comprising molds having rod guiding means and guide rods slidably receivable by rod guiding means of other molds as well as follower members alternating with said molds in aligned relationship, said follower members being slidably movable in said molds and being perforated to receive said guide rods slidably.

8. An apparatus for processing and molding meat comprising, in combination, a plurality of open-topped molds provided with guide rods and ears aligned therewith, follower members slidable in said molds and perforated to receive said guide rods slidably, and pressure generating means, said molds and follower members alternating with each other in stacked relationship with said rods received by said ears and by said follower members, said pressure generating means being attached to the uppermost follower member and to the lowermost mold, to urge said follower members into said molds.

9. As an article of manufacture, an open-topped mold for meat products adapted to be stacked with other like molds, said mold having means for attaching to the mold sides upright guide members and means for slidingly receiving guide members attached to subjacent molds when said molds are stacked.

10. As an article of manufacture, a pan-like meat cooking mold having integral therewith guide means for telescoping cooperation with another like mold whereby said mold may be aligned in stack formation with another like mold to enable a plurality of such molds to be used together as a unit during the meat processing operations.

11. As an article of manufacture, a mold adapted for compacting one of a plurality of portions of a meat product when aligned with other like molds adapted for compacting other portions, the aligned relationship being maintained by guide members, said mold comprising an open top pan, and members formed to receive slidingly said guide members, said pan having guide members connected therewith for sliding cooperation by adjacently aligned molds.

12. In an apparatus for the processing and molding of a meat product, a plurality of molds each adapted to contain a portion of the product, said molds being aligned in tandem relationship, a plurality of means distributed between said molds for maintaining said aligned relationship from the initial moment of assemblage of said apparatus, and common pressure generating means to compress the portion of meat product contained in said molds.

FRANK H. HOY.